United States Patent

Johnson

(10) Patent No.: US 6,663,951 B2
(45) Date of Patent: Dec. 16, 2003

(54) TWO LAYER COATING SYSTEM HAVING AN ENHANCED VISUAL EFFECT

(75) Inventor: Daniel W. Johnson, Anne Arbor, MI (US)

(73) Assignee: BASF Corporation, Southfield, MI (US)

(*) Notice: Subject to any disclaimer, the term of this patent is extended or adjusted under 35 U.S.C. 154(b) by 0 days.

(21) Appl. No.: 09/740,057

(22) Filed: Dec. 18, 2000

(65) Prior Publication Data

US 2002/0076546 A1 Jun. 20, 2002

(51) Int. Cl.[7] .............. B32B 5/16; B32B 9/04
(52) U.S. Cl. ............. 428/324; 428/328; 428/411.1
(58) Field of Search .............. 428/31, 219, 220, 428/323, 324, 328, 332, 688, 689, 908.8, 411.1

(56) References Cited

U.S. PATENT DOCUMENTS

| | | | |
|---|---|---|---|
| 3,087,829 A | 4/1963 | Linton | 106/291 |
| 4,456,486 A | 6/1984 | Bernhard | 106/417 |
| 4,499,143 A | 2/1985 | Panush | 428/336 |
| 4,539,258 A | 9/1985 | Panush | 428/324 |
| 4,547,410 A | 10/1985 | Panush et al. | 427/388.2 |
| 4,551,491 A | 11/1985 | Panush | 524/31 |
| 4,598,015 A * | 7/1986 | Panush | 428/324 |
| 4,598,020 A | 7/1986 | Panush | 428/411.1 |
| 4,605,687 A | 8/1986 | Panush | 523/171 |
| 4,615,940 A | 10/1986 | Panush et al. | 428/324 |
| 4,753,829 A | 6/1988 | Panush | 417/385.5 |
| 4,971,841 A | 11/1990 | Panush et al. | 427/407 |
| 5,238,492 A | 8/1993 | Itoh et al. | 106/436 |
| 5,741,355 A | 4/1998 | Yamamoto et al. | 106/417 |
| 5,830,567 A | 11/1998 | Panush | 428/324 |
| 5,830,581 A * | 11/1998 | Masuda et al. | 428/463 |
| 5,855,660 A | 1/1999 | Bujard et al. | 106/418 |
| 5,871,827 A | 2/1999 | Jaffe et al. | 428/29 |
| 5,972,098 A | 10/1999 | Andes et al. | 106/436 |
| 5,985,020 A | 11/1999 | Andes et al. | 106/436 |
| 6,056,815 A | 5/2000 | Fu | 106/417 |
| 6,060,135 A * | 5/2000 | Service | 428/31 |
| 6,096,378 A * | 8/2000 | Komatsu et al. | 427/407.1 |
| 6,113,683 A | 9/2000 | Herren et al. | 106/494 |
| 6,132,873 A | 10/2000 | Dietz et al. | 428/404 |
| 6,139,615 A | 10/2000 | Jones | 106/418 |

OTHER PUBLICATIONS

Engelhard Change the Nature of Things, Create a Difference Exterior Special Effects Pigments.

Written Opinion for PCT/US01/42648, International Filing date Oct. 10, 2001.

* cited by examiner

*Primary Examiner*—Paul Thibodeau
*Assistant Examiner*—Sheeba Ahmed (57) ABSTRACT

The invention provides a curable two layer effect providing coating system which provides a visual appearance and effect previously obtainable only with a curable three layer effect providing coating system. The two layer effect providing coating system of the invention consists essentially of a first layer consisting of a first coating composition (a), and a transparent second layer applied directly to the first layer and consisting of a second coating composition (b) comprising an effective amount of an interference metal oxide coated mica having a hue shift of at least 100°. In a preferred embodiment of the invention the first coating composition (a) will be tinted so as to match the color of the second coating composition (b) when viewed at an angle of 110° from vertical. Most preferably, the first coating composition (a) will comprise (i) at least 95 weight percent titanium dioxide pigment and (ii) no more than 5 weight percent of one or more tint pigments, all based on the total weight of the first coating composition (a).

21 Claims, 2 Drawing Sheets

FIGURE 1

FIGURE 2

TWO LAYER COATING SYSTEM HAVING AN ENHANCED VISUAL EFFECT

FIELD OF THE INVENTION

The invention relates to curable effect providing coating systems and more particularly to two layer effect providing coating systems.

BACKGROUND OF THE INVENTION

Coatings have long been used to provide a protective finish for vulnerable or exposed substrates. Such systems typically provide protection from the effects of outdoor exposure and use as well as resistance to corrosion and chemicals such as acids, solvents and the like. However, the atheistic visual appearance or effect provided by a coating composition or system is equally important, particularly in the automotive industry.

Although automotive basecoats and topcoats were once primarily relied upon to provide a single color effect, more recent years have seen the introduction of metallic, pearlescent and opalescent color effects. Metallic effects, in which the appearance of sparkle is imparted to a finished film, are achieved by the introduction of finely divided metallic flake or mica particles into one or more layers of the coating system. Typical systems of this type are disclosed in U.S. Pat. Nos. 4,048,136; 4,499,143; and 4,605,687. Pearlescent or opalescent color effects have been achieved by the introduction of particles of mica which have previously been encapsulated in a thin layer of a metal oxide into one or more layers of the coating system. Typical systems of this type are disclosed in U.S. Pat. Nos. 4,530,258; 4,457,410; 4,551,491; 4,598,015; 4,498,020; and 4,615,940.

While many of these systems provide unique and desirable color and special appearance effects, improvements in visual appearance are constantly being sought. Improvements and new effects that are ever more lustrous, satiny or liquid in appearance are desired, especially with improved depth and clarity as well as special color highlights, hues and shifts. The most desirable appearance effects are those which make traditional colors such as white, beige, gray and the like, more interesting and appealing to the consumer.

Thus, more dramatic hue shifts, particularly in the angle of viewing available to the casual observer, i.e., a 25° angle to 75° angle of viewing, are especially desired. For example, an observer of a coated surface would initially percieve a first color or effect when said coated surface is viewed at a 0° angle, i.e., perpendicular to the observers' eye or directly opposite the observer's line of sight. However, when the coated surface is slowly moved so as to be oblique to the observer's line of sight, i.e., at a 25° to 75° angle of viewing, the observer would like to see a dramatic hue or color shift relative that first perceived color or effect. Thus, what is desired is a particular color effect which is dependent upon the angle of viewing. Such particularly desired hue shifts can provide highlight colors of red, blue, green, gold, violet, or orange to a coating system, resulting in a more aesthetically appealing appearance and effect.

While the use of metal oxide coated micas is known in coatings, i.e., see U.S. Pat. Nos. 3,087,829, 4,456,486, 4,551,491, 4,598,015, and 5,741,355, such compositions have failed to provide dramatic color shifts at the various angles of viewing. This is especially true in regards to unique appearance effects in white and/or pastel automotive body colors.

Moreover, the prior art has failed to date to provide such visual effect improvements in commercially feasible effect providing coating systems. Those prior art special effect coating systems which do provide prior art visual appearance effects generally require multilayer applications. The prior art has utilized such multilayer systems in order to balance appearance considerations with durability and protection requirements.

For example, U.S. Pat. Nos. 4,539,258 and 4,615,940 describe a multilayer coating system wherein a least three coating layers must be used to provide the desired opalescent effects. In such systems, the opalescent effect derives from the use of a primer layer or intermediate layer containing metal oxide encapsulated mica particles in addition to a basecoat and a clearcoat. The desired visual effects are obtained only with the use of the disclosed third layer. Failure to use the required third layer in conjunction with both a basecoat and a transparent topcoat results in a nondesireable visual appearance.

BASF Corporation of Southfield, Mich. provides a commerically available ivory three-layer coating system wherein a transparent topcoat is applied over an intermediate layer comprising metal oxide encapsulated micas. The intermediate layer is applied over a pigmented basecoat which has been tinted to match the "flop" or hue shift of the intermediate layer.

However, the application of a third effect providing coating layer is greatly disfavored in view of practical manufacturing considerations. The application of a three-layer effect providing coating system requires more space, equipment, time, and/or expense than that required to apply a two-layer effect providing coating system. It may also result in the discharge of greater amounts of volatile organic solvents as a result of the additional application step. Thus, most automotive manufacturers require the use of no more than a two-layer effect providing coating system. That is, the desired appearance must be provided by either a single topcoat or a two-coat composite system, the latter highly favored and most often being a pigmented basecoat followed by a transparent clearcoat.

Finally, many of the prior art effect providing coating systems suffer from mottling, a visual defect which detracts from the appearance of the finished film. Mottling may generally be described as an undesirable variation in the visual appearance and color at a particular angle of viewing. Mottling is believed to be a function of the varied orientation of flaked pigments in a coating, usually a basecoat, and can occur as a result of various application problems, or as a result of an inherently weak basecoat rheology system.

Mottling can sometimes be fixed by improving basecoat application or rheology. In other systems, the only possibility is to change the flake or pigment system of the basecoat or surrounding coatings, especially transparent or semi-transparent flake containing coatings. It would be advantageous to provide an effect providing coating system which provides a pearlescent or luminescent appearance and which is less likely to exhibit mottling relative to prior art effect providing coating systems.

Thus, it is an object of the instant invention to provide a two-layer coating system which provides a visual appearance and effect previously obtainable only with the use of a three layer effect providing coating system.

It is another object of the instant invention to provide a two-layer coating system which provides improvements in visual appearance and effect relative to that previously obtainable with prior art three-layer effect providing coating systems.

It is a particular object of the invention to provide a two-layer coating system that provides dramatic improvements in hue shift at viewing angles of from 25° to 75° degrees.

Another desired object of the invention is provide such dramatic hue shifts in conjunction with traditional colors such as white, beige, gray and the like so as to provide heretofore unknown visual effects in a two-layer coating system.

SUMMARY OF THE INVENTION

These and other objects have been achieved with the instant invention. It has unexpectedly been found that the use of certain metal oxide encapsulated mica pigments in a particular two-layer coating system results in new and improved visual effects while maintaining the performance requirements and characteristics of a commercially acceptable three-layer effect providing coating system.

The curable effect providing coating system of the invention consists essentially of a first layer consisting of a first coating composition (a), and a transparent second layer applied directly to the first layer and consisting of a second coating composition (b) comprising an effective amount of an interference metal oxide coated mica having a hue shift $\Delta h$ of at least 100°.

In a preferred embodiment of the invention the first coating composition (a) will be tinted so as to provide a colored appearance which is matched to the color observed in the transparent second layer (b) when it is viewed at an angle of 110° from vertical.

Most preferably, first coating composition will comprise (i) at least 95 weight percent titanium dioxide pigment and (ii) no more than 5 weight percent of one or more tint pigments selected from the group consisting of opaque yellow oxide, opaque red oxide, black, bismuth vanadate, isoindolines, quinacridones, indanthrones, phthalo, nickel azos, and benzimidazolone and mixtures thereof, all based on the total weight of the first coating composition (a).

DETAILED DESCRIPTION OF THE PREFERRED EMBODIMENTS

The instant invention relates to effect providing coating systems. As used herein, "effect providing" refers to one or more coating composition layers which are primarily responsible for the color of the coated surface. As such, traditional primers and/or sealers which are pigmented to achieve particular performance parameters such as corrosion, adhesion and/or smoothness, are generally not considered to be part of an "effect providing" coating system. If however, such primers and/or sealers are pigmented so as to achieve an effect or color which is a part of the overall final color or appearance, said primers and/or sealers are be considered to be part of the "effect providing" coating system.

The two layer effect providing coating system of the invention comprises a pigmented first layer consisting of a first coating composition (a), and a transparent second layer applied directly to the first layer and consisting of a second coating composition (b) comprising an effective amount of an interference metal oxide coated mica having a hue shift $\Delta h$ of at least 100°, at viewing angles of from 15° to 75°.

The transparent second layer results from the application of a second coating composition (b). Second coating composition (b) is most preferably a transparent clearcoat coating composition comprising an interference metal oxide coated mica having a minimum hue shift ($\Delta h$) of at least 100°, at viewing angles of from 15° to 75°. Transparent as used herein refers to a cured or curable coating composition which permits the passage of rays of the visible spectrum.

As used herein, "interference metal oxide coated mica" refers to a particular class of metal oxide coated micas, which produce a specific visual effect at a particular angle of viewing. In general, an interference metal oxide coated mica is a mica particle having a particular aspect ratio which is coated with a particular thickness of a metal oxide such that it generates a chromatic, reflective color at the flash, and an opaque complement in the face and flop.

As used herein, "face" "flash" and "flop" refer to the appearance of a coated panel at a particular angle of viewing as well as the noted angle of viewing. "Face" is the color and effect of a coated panel when it is viewed at a 0° angle, i.e., perpendicular to and facing the observer's eye. "Flash" is the perceived color and effect of the coated panel when the coated panel is held and viewed at an angle of from 25° to 30° from perpendicular to the eye. Flash is generally the brightest appearance and angle. "Flop" refers to the color and effect perceived when the coated panel is held at an angle of from 110° to 120° from perpendicular to the eye.

Generally, an observer of a surface coated with a coating composition containing a masstone concentration of an interference metal oxide coated mica will perceive the "color" of the coated surface as a chalky pinkish pastel at viewing angles of from 0° to 25°. However, when viewed from flash to flop, the same coated surface will appear to be a different "color".

For example, a masstone coated panel can be prepared by preparing a curable coating composition having a maximum pigment to binder ratio (P/B) wherein the pigment is solely an intererence metal oxide coated mica pigment. This masstone coating composition is then sprayed to hiding, i.e., the coating composition is applied at a film build sufficient to completely obscure a black and white figure affixed to the substrate to be coated. The color differences dependent upon the angle of viewing can then be identified and quantified by spectrophotometer measurement.

Figure 1:
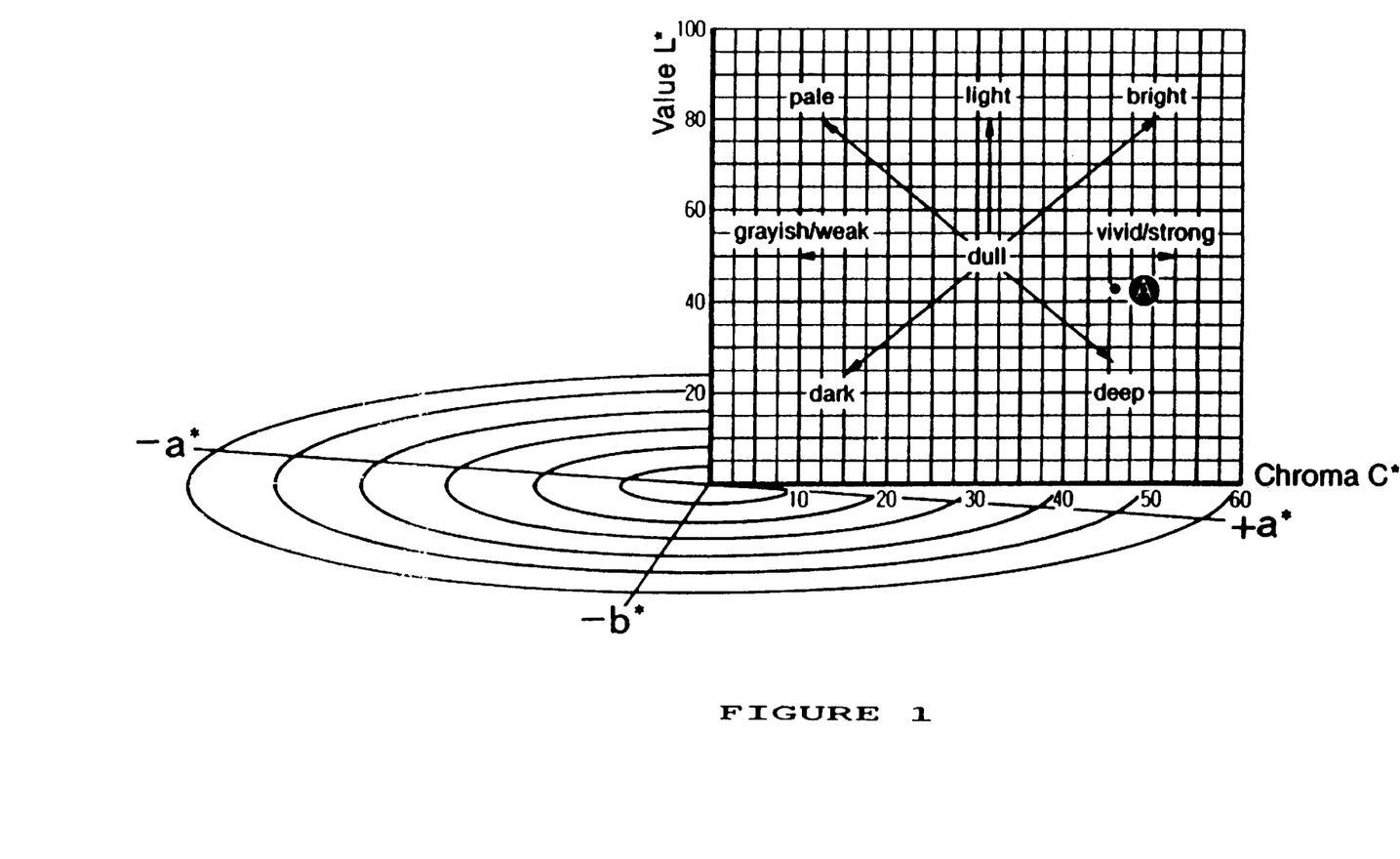

This color shift from flop to flash can be described in terms of L*a*b readings and more specifically in terms of $\Delta*a$ and $\Delta*b$ values which reflect hue shift. Referring to FIG. 1, there is shown a simplified section through the CIE 1976 (L*, a*, b*) color space diagram based on the color measurement system introduced by Richard S. Hunter, "Photoelectric Tristimulus Colorimetry with Three Filters," National Bureau of Standards Circular 429, United States Government. Printing Office, 1942, reprinted in J. Opt. Soc. Am., 32, 509–538 (1942) which is incorporated herein by reference. A particular color can be completely described by defining its value (lightness), hue (color), and chroma (degree of color saturation). In this system the value of a color, L*, corresponds to its lightness and ranges from zero (black) to one hundred (white). The hue of a color is designated by values of a* and b*, with a* corresponding to redness (if a* is positive) or greenness (if a* is negative), and yellowness (if b* is positive) or blueness (if b* is negative). The chroma of the color is designated C* and is equal to the square root of the sum of the squares of a* and b*. $\Delta*a$ and $\Delta*b$ respectively refer to the color shift between particular viewing angles. Vales of $\Delta*a$ and $\Delta*b$ may be measured via a sphectrophotometer.

In FIG. 1, the value (L*) of a color is measured on the vertical axis, while a* and b* are measured as points on a rectangular coordinate system in the plane horizontal to the L* axis. Chroma (C*) is measured by the perpendicular distance from the L* axis to the point fixed by a* and b*. For example, in FIG. 1, the color represented by point A is shown having a value of L*=44, and a hue represented by a*=45 and b*=10. The chroma, or degree of saturation of this color is thus (45.sup.2+10.sup.2).sup.0.5=46.10.

As can be seen further from FIG. 1, the common descriptions of colors can be derived from the value and chroma of a color. For example, colors of a particular hue can be "bright" (high L value and chroma), "vivid" (high chroma, medium L value), "deep" (low L value and high chroma), "dark" (low L value and chroma), "weak" (low chroma, medium L value), "pale" (high L value and low chroma), or "light" (high L value, moderate chroma). Colors of intermediate value tend toward grayishness or weakness as their chroma decreases.

Figure 2:
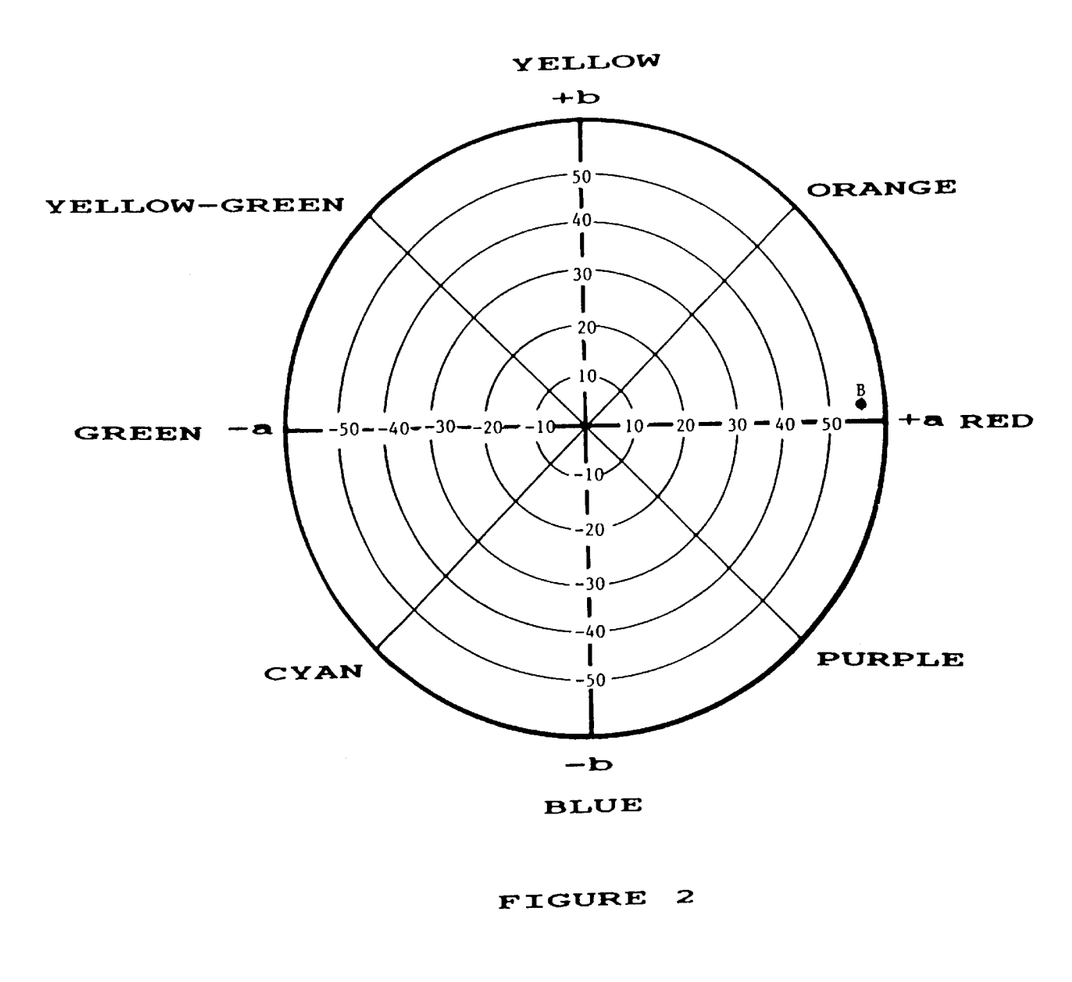

Referring to FIG. 2, a horizontal section through the CIE 1976 (L*, a*, b*) color space diagram at constant L* is shown. The common names of the colors are shown around the periphery of the graph.

In the instant case, the hue shift Δh of interference metal oxide coated micas suitable for use in the instant invention may be described as the value of Δh from measurements taken at 15° and at 75° on a multiangle goniosphectrophotometer such as an XRite™ Model MA68II. "h" is the measurement of hue in the L*a*b system, and is expressed in degrees around the L axis, with red at 0°, yellow at 90°, green at 180°, and blue at 270°. The hue measurement is a measurement of the angle created by a line from the 0,0 point of the a*, b* plane to a set of a*, b* coordinates, and a line arbitrarily defined as 0° running along the positive a* axis.

Interference metal oxide coated micas suitable for use in the instant invention will generally have a hue shift Δh of at least 100°, more preferably at least 130° and most preferably greater than or equal to 180°. Δh values of from 130°–180° are preferred. It will be appreciated that noninterference metal oxide coated micas will generally have Δh values of less than 10. Most preferred interference metal oxide coated micas for use in the instant invention have illustrative Δh values of 139°, 164°, 208°, and 166°. Such values respectively correspond to the highlight "colors" perceived in a masstone composition of the interference metal oxide coated mica when observed at viewing angles of from 15°–75°, i.e., green, gold, red, purple, and blue. As indicated above, the masstone composition is generally coated over a white or light colored basecoat and evaluated on a multiangle goniospectrophotometer such as described herein.

Metal oxide coated micas suitable for use in the instant invention may be either natural or synthetic mica. Synthetic micas are most preferred. Examples of synthetic micas are aluminum oxide, fluoro phlogopite, fluoro tetrasilicic mica, fluoro taeniolite and isomorphous substitutents thereof with aluminum oxide ($Al_2O_3$) being most preferred.

Mica particles suitable for use in the instant invention will generally have a diameter of from 10–40 microns and a thickness of less than 0.4 microns. Moreover, such mica particles will generally have an aspect ratio, i.e., length divided by thickness, of from 50 to 80 or greater. More preferably, mica particles for use in the instant invention will have a length of from 10 to 40 microns and a thickness of from 0.1 to 0.3 microns, with an aspect ratio of from 70 to 90. Most preferred mica particles will have a length of from 20 to 30 microns, a thickness of from 70 to 90 and an aspect ratio of from 70 to 90.

The metal oxides used to encapsulate the mica particles may be titanium dioxide, ferric oxide, chromium hydroxide, methacrylatochromium chloride, and the like and mixtures thereof. Titanium dioxide is a most preferred metal oxide.

The thickness of the metal oxide coating layer contributes to the particular interference colors produced by a interference metal oxide coated mica. Accordingly, the metal oxide thickness should be generally be from 40 to 175 nm, more preferably from 50 to 160 nm and most preferably from 60 to 150 nm, with thicknesses of from 75–95 nm being especially preferred.

Illustrative examples of suitable interference metal oxide coated micas for use in the instant invention are the interference micas commerically available from Engelhard Corporation of Iselin, N.J. Particularly suitable are Xirallic™ interference micas commercially available from EM industries of Hawthorne, N.Y.

The interference metal oxide coated micas for use in second coating composition (b) will generally be present in composition (b) in an amount effective to produce the desired visual effect but not enough to impair the transparent nature of coating (b) or to negatively influence the physical performance parameters of the finished transparent film. Finished film properties such as gloss and distinctness of image (DOI) are especially important and are affected by the concentration of pigment. As a result, it is most desirable to minimize the concentration of the interference metal oxide coated mica. In general, the interference metal oxide coated micas will be present in the second coating composition (b) in an amount of less than 30 percent by weight, based on the total film forming solids of second coating composition (b). "Film forming solids" refers to the total percent nonvolatile solids of all resinous, polymeric, and/or oligomeric components which contribute to the formation of the finished film. In order to minimize any negative effects on second coating composition (b), the interference metal oxide coated micas will generally be used in an amount of from 0.1 to 5.0%, more preferably from 0.1 to 1.5% and most preferably from 0.1 to 0.8%, all based on the total film forming solids of second coating composition (b). It is most preferred that second coating composition (b) contain no pigmentation other than the interference metal oxide coated micas.

Second coating composition (b) may be any of the known clearcoat compositions. Most preferably second coating composition (b) will be a curable thermosetting coating comprising a component (b)(i) having a plurality of active hydrogen-containing functional groups and a curing agent (b)(ii) having functional groups reactive with those of component (b)(i). Second coating composition (b) may be a one component composition or a two component composition.

Examples of suitable components (b)(i) include acrylic polymers, modified acrylic polymers, polyesters, polyepoxides, polycarbonates, polyurethanes, polyamides, polyimides, and polysiloxanes, all of which are well-known in the art. Preferably, the polymer is an acrylic, modified acrylic, polyester, polyurethane or polyester-polyurethane copolymer. More preferably, the polymer is an acrylic polymer. Active hydrogen-containing functional groups on polymer resins are well-known in the art. Such groups include, for example, carbamate groups, especially primary carbamate groups, hydroxyl groups, amino groups, thiol groups, hydrazide groups, and activated methylene groups. Preferred active hydrogen-containing groups are carbamate, hydroxyl groups and mixtures thereof.

In one preferred embodiment of the invention, component (b)(1) is an acrylic polymer. Suitable acrylic polymers may have a molecular weight of 500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used as component (b)(1) according to the invention. Such acrylics may be polyester-modified acrylics or polyurethane-modified acrylics, as is well-known in the art. Polyester-modified acrylics modified with ϵ-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having active hydrogen groups such as hydroxyl groups can also be used as the component (b)(1) in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Carbamate functional components (b)(i) used in the composition of the invention can be prepared in a variety of ways. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing carbamate functional components (b)(i) used in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing carbamate functional polymers useful as component (b)(i) involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

Carbamate functional components (b)(i) will generally have a molecular weight of 2000–20,000, and preferably from 3000–6000. As used herein, molecular weight means number average molecular weight, and can be determined by the GPC method using a polystyrene standard. The carbamate content of the polymer, on a molecular weight per equivalent of carbamate functionality, will generally be between 200 and 1500, and preferably between 300 and 500. The glass transition temperature, $T_g$, of components (A) and (B) can be adjusted to achieve a cured coating having the $T_g$ for the particular application involved.

Carbamate functional components (b)(i) can be represented by the randomly repeating units according to the following formula:

wherein

In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include —$(CH_2)$—, —$(CH_2)_2$—, —$(CH_2)_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

wherein

In this formula, $R_1$, $R_2$, A, x, and y are as defined above. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

In a most preferred embodiment, component (b)(i) will be selected from the group consisting of carbamate functional acylics, carbamate functional modified acrylics, hydroxyl functional acrylics, hydroxyl functional modified acrylics, polyurethanes, polyesters and mixtures thereof, with carbamate functional acylics and hydroxyl functional acrylics being especially preferred.

The second coating composition (b) utilized in the invention is cured by a reaction of the active hydrogen-functional compound (b)(1) with a curing agent (b)(ii) having a plurality of functional groups that are reactive with the active hydrogen groups on component (b)(i). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of illustrative curing agents (b)(ii) include melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred for use as curing agent (b)(ii).

One or more solvents may be utilized in second coating composition (b)(ii) used in the practice of the present invention. Such one or more solvents will preferably act as solvents with respect to both components (b)(i) and (b)(ii) of second coating composition (b). In general, depending on the solubility characteristics of components (A) and (B), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

Second coating composition (b) may also include a catalyst to enhance the cure reaction. For example, when aminoplast compounds, especially monomeric melamines, are used as component (b)(ii), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in second coating composition (b) in an amount of from about 0.01 weight percent to about 99 weight percent, preferably from about 10 weight percent to about 60 weight percent, and more preferably from about 30 weight percent to about 50 weight percent.

Any additional agent used, for example, surfactants, fillers, stabilizers, wetting agents, dispersing agents, adhesion promoters, UV absorbers, HALS, etc. may be incorporated into second coating composition (b). While the agents are well-known in the prior art, the amount used must be controlled to avoid adversely affecting the coating characteristics.

The second coating composition (b) will be applied over pigmented first coating composition (a). In a particularly preferred embodiment, pigmented first coating composition according to the invention is a high-gloss coating utilized as the basecoat or color coat of a composite color-plus-clear coating. High-gloss coatings as used herein are coatings having a 20° gloss (ASTM D523-89) or a DOI (ASTM E430-91) of at least 80.

First coating composition (a) will most preferably comprise one or more pigments. The pigments used in pigmented first coating composition (a) may be any organic or inorganic compounds or colored materials, fillers, metallic or other inorganic flake materials such as mica or aluminum flake, and other materials of kind that the art normally names as pigments.

In a preferred embodiment, first coating composition (a) will at a minimum comprise one or more color providing pigments. Such pigments may generally described as those which create a desired color effect and provide enough opacity to hide a black and gray checkerboard at a film thickness of from 7µ to 40µ. Illustrative examples of suitable pigments are white pigments, opaque yellow iron oxide, opaque red iron oxide, black, bismuth vanadate, isoindolines, quinacridones, indanthrones, phthalos, nickel azos, and benzimidazolones and mixtures thereof. Pigments are usually used in the composition in an amount of 0.1% to 100%, based on the total solid weight of the film forming components (a)(i) and (a)(ii) or (b)(i) and (b)(ii), (i.e., a P:B ratio of 0.1 to 1), preferably a P:B ratio of from 0.5 to 3.0, and most preferably a P:B ratio of from 0.6 to 1.5.

In a preferred embodiment of the invention, the pigments used in first coating composition (a) will be such that the color of first coating composition (a) is a white or pastel color. White and pastel can be defined as colors in L*a*b space as having high L values and low a and b values. A true white would have a and b values of 0. In particular, the pigments of the first coating composition (a) will comprise 95% or more $TiO_2$, and 5% or less of any of other non-$TiO_2$ pigments, preferably from 95.0 to 97.0% $TiO_2$ and 5.0 to 3.0% non-$TiO_2$ pigments and most preferably from 99.0 to 99.9% $TiO_2$ and 1.0 to 0.1% non-$TiO_2$ pigments. Non-$TiO_2$ pigments will generally be selected from those nonwhite pigments which create a desired color effect and provide enough opacity to hide a black and gray checkerboard at a film thickness of from 7µ to 40µ. Preferred examples may be selected from the group consisting of opaque yellow iron oxide, opaque red iron oxide, black, bismuth vanadate, isoindolines, quinacridones, indanthrones, phthalos, nickel azos, and benzimidazolones and mixtures thereof.

In a most preferred embodiment of the invention, the first coating composition (a) will be pigmented such that the color of the first coating composition (a) matches or nearly matches the color of the second coating composition (b) when coated surfaces of both are viewed at the flop or 110–120° from perpendicular to the observer's eye. It has been found that the matching of these colors of first and second coating compositions (a) and (b) reduces the appearance of mottling in the final effect providing coating system. Thus, the the first coating composition (a) will generally have a $\Delta h$ which is within –50 to +50 degrees of the interference titanium dioxide coated mica used in second coating composition (b), when $\Delta h$ is measured at 110°. In a preferred embodiment, the first coating composition (a) will have a $\Delta h$ which is within –30 to +30 degrees of the interference titanium dioxide coated mica used in second coating composition (b), when $\Delta h$ is measured at 110°. In a most preferred embodiment, the first coating composition (a) will have a $\Delta h$ which is within –10 to +10 degrees of the interference titanium dioxide coated mica used in second coating composition (b), when $\Delta h$ is measured at 110°.

First coating composition (a) may be any of the known basecoat compositions. Most preferably first coating composition (a) will be a curable thermosetting coating composition comprising a component (a)(i) having a plurality of active hydrogen-containing functional groups and a curing agent (a)(ii) having functional groups reactive with those of component (b)(i). First coating composition (a) may be a one component composition or a two component composition.

The film forming components (a)(i) and (a)(ii) of pigmented first coating composition (a) may be any of a number of types known in the art and/or as discussed above in regards to film forming components (b)(i) and (b)(ii). Polymers known in the art to be particularly useful in basecoat compositions include acrylics, vinyls, polyurethanes, polycarbonates, polyesters, alkyds, and polysiloxanes. Preferred polymers include acrylics and polyurethanes as discussed above. In one preferred embodiment of the invention, the basecoat composition (a) utilizes a carbamate-functional acrylic polymer as discussed above. Basecoat polymers may be thermoplastic, but are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be thermoplastic, self-crosslinkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents. Aminoplast, isocyanate, and blocked isocyanate are most preferred for use as film forming component (a)(ii) of first coating composition (a).

First coating composition (a) may further comprise solvents, catalysts and/or additives as are described above with regards to second coating composition (b). In a particularly preferred embodiment, first coating composition (a) will be a water borne pigmented basecoat, especially a hydroxyl functional acrylic or polyester/melamine based system.

The first and second coating compositions (a) and (b) may be applied on a desired article by any of a number of techniques well-known in the art. These include, for example, spray coating, dip coating, roll coating, curtain coating, and the like. For articles such as automotive body panels, spray coating is preferred. Articles to be coated may be metal, plastic, and mixtures thereof.

The first and second coating compositions (a) and (b) described herein are preferably subjected to conditions so as to cure the coating layers. While first and second coating compositions (a) and (b) may be cured independently of each other, in a particularly preferred embodiment, second coating composition (b) will be applied to a "wet" or substantially uncured first coating composition (a) followed by a single or joint cure schedule. Although various methods of curing may be used, heat curing is preferred. Generally, heat curing is effected by exposing the coated article to elevated temperatures provided primarily by radiative heat sources. Curing temperatures will vary depending on the particular functional groups and whether any blocking groups were used in the cross-linking agents, however temperatures generally range between ambient to 205° C., more preferably from 93° C. to 177° C. The curing time will vary depending on the particular components used, and physical parameters such as the thickness of the layers, however, typical curing times range from 15 to 60 minutes, preferably 15–25 minutes and most preferably 10–20 minutes.

EXAMPLE I

Preparation of Second Coating Compositions (b) According to the Invention

Three different commercially available production clearcoats (respectively A, B, and C) were reduced to the recommended viscosity according to the manufacturer's specifications. Clearcoat A was a standard acrylic/melamine type clearcoat, commercially available from BASF Corporation of Southfield, Mich. as E126CE012A. Clearcoat B was a blocked isocyanate polyurethane clearcoat, commercially available from BASF Corporation of Southfield, Mich. as R126CG2020. Clearcoat C was a 2 component isocyanate polyurethane, commercially available from BASF Corporation of Southfield, Mich. as E10CE008S. (For Clearcoat C, the total film forming solids used were the combination of both A and B components, such that, when combined, the weight of A+B=3500 grams.)

3500 grams of each clearcoat was loaded into a container and agitated using a spinner blade attached to an air motor. Varying amounts of a commercially available gold interference mica (Xirallic™ interference gold mica from EM industries of Hawthorne, N.Y.) were then added to each sample based on the total film forming solids of the clearcoat. Samples were prepared per the following P:B ratios: (1) 0.005 P/B, (2) 0.010 P/B, (3) 0.015 P/B, (4) 0.025 P/B, and (5) 0.050 P/B.

Preparation of Two-layer Effect Providing Coating Systems According to the Invention An acrylic/melamine, high solids white basecoat, commercially available from BASF Corporation of Southfield, Mich. as E17WJ614, was applied as first coating composition (a) to primed aluminum panels and flashed for 5 minutes at ambient. Clearcoat samples A(1)–(5), B(1)–(5), and C(1)–(5) were applied over the uncured white basecoat. The clearcoated panels were flashed for approximately 10 minutes before baking for 30 minutes at 265° F. The cured panels were evaluated for gloss, DOI, and mottle.

A second set of panels was prepared except that in this case, first coating composition (a) was an acrylic melamine based black basecoat, commercially available available from BASF Corporation of Southfield, Mich. as E174KJ606.

The white basecoated panels presented a good appearance, but the black basecoated panels presented unacceptable mottling. Panels having a 0.005 P/B, 0.010 P/B, or 0.15 P/B showed good DOI and gloss in comparision with those having a P/B of 0.25 or 0.50.

EXAMPLE II

Preparation of Second Coating Compositions (b) According to the Invention

Clearcoat samples 1, 2, and 3, having P:B ratio of 0.005, 0.010, and 0.015, were prepared as indicated above in Example I.

Preparation of First Coating Compositions (a) According to a Preferred Embodiment of the Invention The white basecoat from Example I was tinted with the following amounts of pigments: 0.2% indanthrone blue—0.1% black and 0.5% yellow oxide.

Preparation of Two-layer Effect Providing Coating Systems According to the Invention Coated panels were prepared as indicated in Example I using the clearcoat and basecoat samples of Example II. The resulting cured panels were then evaluated for mottle versus the untinted white basecoats panels of Example I. In each case, the tinted basecoat version was better for mottle.

I claim:

1. A curable effect providing coating system consisting of:
   a substrate,
   a first layer comprising (1) at least 95 weight percent titanium dioxide pigment and (ii) no more than 5 weight percent of one or more tint pigments selected from the group consisting of opaque yellow oxide, opaque red oxide, black, bismuth vanadate, isoindolines, quinacridones, indanthrones, phthalo, nickel azos, benzimidazolone and mixtures thereof, all based on the total film forming solids of the first layer, and
   a transparent layer applied directly to the first layer and comprising 0.1 to 5.0 weight % of an interference titanium dioxide coated mica having a $\Delta h$ of at least 100° based on the total film forming solids of the second layer and
   wherein the first layer has a $\Delta h$ within −30 to +30 degrees of the interference titanium dioxide coated mica of the second layer when $\Delta h$ is measured at 110°.

2. The coating system of claim 1 wherein the interference titanium dioxide coated mica has an aspect ratio of at least 40.

3. The coating system of claim 2 wherein the interference titanium dioxide coated mica has an aspect ratio of from 50 to 80.

4. The coating system of claim 1 wherein the interference titanium dioxide coated mica has a $\Delta h$ value of at least 130°.

5. The coating system of claim 1 wherein the first layer is substantially free of metallic pigment.

6. The coating system of claim 1 wherein the first layer has a $\Delta h$ within −10 to +10 degrees of the interference titanium dioxide coated mica of the second layer when $\Delta h$ is measured at 110°.

7. The coating system of claim 3 wherein the interference titanium dioxide coated mica has an aspect ratio of at least 55.

8. The coating system of claim 1 wherein the second layer comprises 0.1 to 1.5 weight % of an interference titanium dioxide coated mica based on the total film forming solids of the second layer.

9. A method of providing a coated substrate with a visual effect, comprising:
   applying to a substrate an effect providing coating system comprising a first layer comprising (1) at least 95 weight percent titanium dioxide pigment and (ii) no more than 5 weight percent of one or more tint pigments selected from the group consisting of opaque yellow oxide, opaque red oxide, black, bismuth vanadate, isoindolines, quinacridones, indanthrones, phthalo, nickel azos, benzimidazolone and mixtures thereof, all based on the total film forming solids of the first layer, and
   a transparent layer applied directly to the first layer and comprising 0.1 to 5.0 weight % of an interference titanium dioxide coated mica having a $\Delta h$ of at least 100° based on the total film forming solids of the second layer and
   wherein the first layer has a $\Delta h$ within −30 to +30 degrees of the interference titanium dioxide coated mica of the second layer when $\Delta h$ is measured at 110°.

10. The method of claim 9 wherein the substrate has a previously applied coating layer.

11. The method of claim 10 wherein the previously applied coating layer has been cured prior to the application of the effect providing coating system.

12. The method of claim 10 wherein the substrate has been electrocoated.

13. The method of claim 10 wherein a primer composition has been applied to the substrate.

14. The method of claim 9 wherein the substrate has not been previously coated.

15. The method of claim 9 wherein the interference titanium dioxide coated mica has a Δh value of at least 130°.

16. The method of claim 9 wherein the first layer is substantially free of metallic pigment.

17. The method of claim 9 wherein the first layer has a Δh within −10 to +10 degrees of the interference titanium dioxide coated mica of the second layer when Δh is measured at 110°.

18. The method of claim 9 wherein the interference titanium dioxide coated mica has an aspect ratio of at least 40.

19. The method of claim 18 wherein the interference titanium dioxide coated mica has an aspect ratio of from 50 to 80.

20. The method of claim 19 wherein the interference titanium dioxide coated mica has an aspect ratio of at least 55.

21. The method of claim 9 wherein the second layer comprises 0.1 to 1.5 weight % of an interference titanium dioxide coated mica based on the total film forming solids of the second layer.

* * * * *